United States Patent [19]

Nyman

[11] Patent Number: 4,538,588
[45] Date of Patent: Sep. 3, 1985

[54] METHOD FOR FORMING GLAZED TILE

[76] Inventor: Stephen H. Nyman, 5301 Westbard Cir., Bethesda, Md. 20016

[21] Appl. No.: 559,194

[22] Filed: Dec. 8, 1983

[51] Int. Cl.³ .......................... B28D 1/32; C03B 33/02
[52] U.S. Cl. .................................... 125/23 R; 225/2; 225/96.5; 225/103
[58] Field of Search .............. 125/23 R, 23 C; 225/2, 225/103, 96.5; 264/62

[56] References Cited

U.S. PATENT DOCUMENTS

| | | | |
|---|---|---|---|
| 3,105,623 | 10/1963 | Hobbs | 225/103 |
| 3,178,085 | 4/1965 | Jochim | 225/96.5 |
| 3,439,664 | 4/1969 | Sylvester | 125/23 R |
| 3,493,155 | 2/1970 | Litant | 225/2 |
| 3,517,871 | 6/1970 | Gaffney | 225/103 |
| 3,536,798 | 10/1970 | Nyman | 264/62 |
| 3,615,047 | 10/1971 | Feldman | 225/96.5 |
| 4,285,451 | 8/1981 | Ferraino | 225/96.5 |

Primary Examiner—Harold D. Whitehead
Attorney, Agent, or Firm—Scrivener Clarke Scrivener and Johnson

[57] ABSTRACT

A method forming a glazed tile with the edges of the glaze in the planes of the side walls of the tile including breaking protruding glaze with a compressible sheet of material.

1 Claim, 9 Drawing Figures

U.S. Patent  Sep. 3, 1985  4,538,588
FIG. 1.
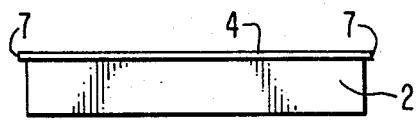
FIG. 2.
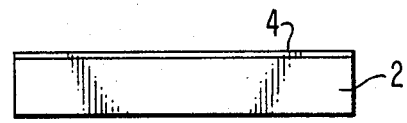
FIG. 3.
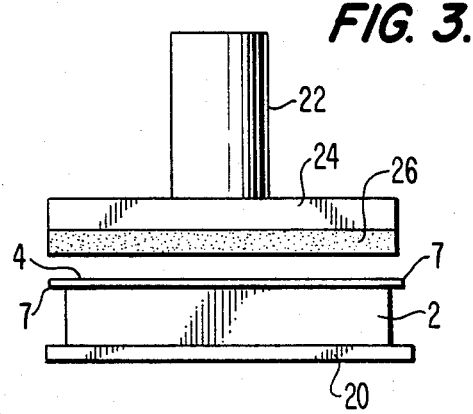
FIG. 4.
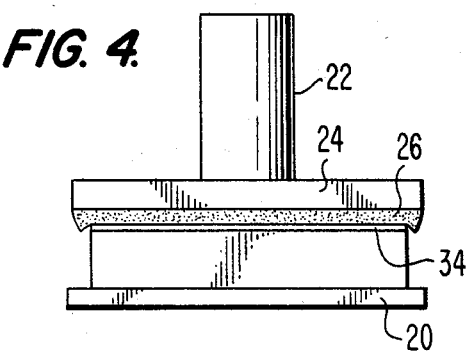
FIG. 5.
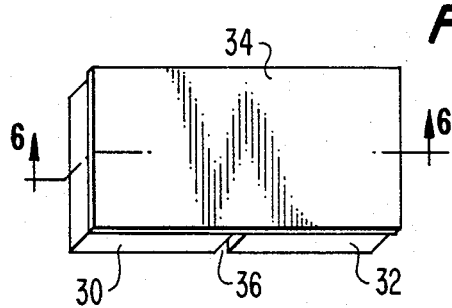
FIG. 6.
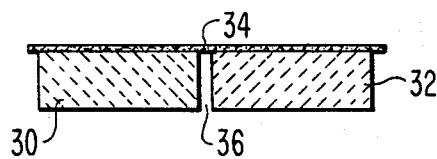
FIG. 7.
FIG. 8.
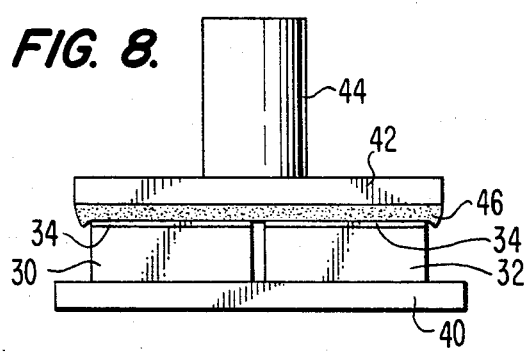
FIG. 9.
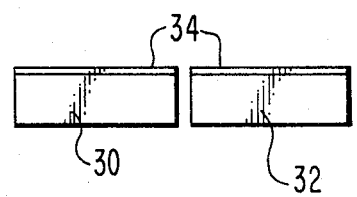

METHOD FOR FORMING GLAZED TILE

SUMMARY OF THE INVENTION

In the manufacture of glazed tile in which all edges of the glaze are flush with the side walls of the tile a glaze is formed on the tile with the edges of the glaze protruding beyond the edges of the tile which must be removed. The invention provides a method and apparatus for removing the protruding edges of the glaze.

BACKGROUND OF THE INVENTION

My present invention relates to the method of forming glazed ceramic tile which is described and claimed in my U.S. Pat. No. 3,536,798. A tile produced by the method of that patent is disclosed in FIG. 1 which illustrates a tile 2 having glaze 4 on one surface thereof which has lateral edges 7 which overhang the lateral side walls of the tile. It will be understood that in order to fit the glazed tile with other glazed tiles to form a mosaic the overhanging lateral edges 7 of the glaze must be removed to a flush condition with the adjacent side walls of the tile in order to produce the finished tile shown in FIG. 2, and my present invention provides means for doing this.

DESCRIPTION OF THE DRAWINGS

FIG. 1 is a side view of a glazed tile;

FIG. 2 is a side view of the tile of FIG. 1 with the overhanging glaze removed;

FIG. 3 is a side view of the tile of FIG. 1 under a pressure plate as provided by the invention;

FIG. 4 is similar to FIG. 3 and shows the pressure plate in contact with the glaze;

FIG. 5 is a perspective view of part of a mosaic composed of two pieces of tile;

FIG. 6 is an enlarged sectional view taken along line 6—6 of FIG. 5;

FIG. 7 is a side elevational view of the assembly of FIG. 6 under a pressure plate;

FIG. 8 shows the action of the pressure plate when pressing the assembly of FIG. 6, and FIG. 9 is a side elevational view showing the completed pieces of glazed ceramic tile after removal from the press of FIGS. 7 and 8.

DESCRIPTION OF THE PREFERRED EMBODIMENT OF THE INVENTION

The method provided by the invention for producing the finished tile of FIG. 2 from the preliminary stage which is shown in FIG. 1 and which is the product of the method and apparatus described in my patent, is disclosed in FIGS. 3 and 4. As shown in those figures the tile with overhanging protruding glaze edges 7 is placed on the fixed bed 20 of a press the movable part of which is positioned above the bed and comprises a ram 22 supporting a rigid head 24 which on its lower surface carries a thick sheet of compressible material 26 the lateral dimensions of which are greater than those of the tile body 2 and are at least as great as those of the glaze 4. After the tile has been placed in the press as shown in FIGS. 3 and 4 the press is operated to force the compressible layer 26 against the upper surface of the glaze, thereby breaking off the protruding edges of the glaze along lines coincident with the planes of the side walls of the tile body. The tile is then removed from the press and has the configuration shown in FIG. 2 in which the side edges of the glaze lie in the plane of the side walls of the tile body.

The method of the invention may be utilizied in removing the protruding edges of a plurality of tile pieces, and in FIGS. 5 and 6 there is disclosed a unitary section of glazed tile having tile pieces 30, 32 which are connected by a glaze 34 which extends beyond the side edge of the tile pieces and across the opening 36 between the two tile pieces. Such a unitary tile consisting of a plurality of tile pieces connected by a glaze is a product of the invention described in my patent which is referred to above.

In FIGS. 7 and 8 there is disclosed the means for removing from the multiple tiles of FIGS. 5 and 6 all overhanging edges of the glaze, and such means comprises a press having a base plate 40 which is large enough to accommodate the multiple tile, a movable head 42 attached to a ram 44 and carrying a layer of compressible material 46 which has sufficient lateral dimensions so that it will extend in all directions beyond the edges of the glaze 34 of the composite tile of FIGS. 5 and 6. As shown in FIG. 8 the operation of the press will cause the layer of compressible material 46 to engage the glaze and force it downwardly, breaking the glaze along all lines co-incident with the side walls of the tile. The end product is disclosed in FIG. 9 and comprises the two tiles each having a glaze the edges of which are in the plane of the side wall of the underlying tile.

I claim:

1. The method of removing from a piece of glazed tile having side walls and a glazed surface the edges of which protrude beyond the side walls of the tile, which consists in supporting the tile, supporting a compressible sheet of material upon rigid backing surface, said backing surface and sheet material extending in all directions beyond the edges of said prortruding glaze, and forcing said supported sheet of compressible material against the glaze and tile with sufficient pressure to break said glaze at each sidewall of said tile.

* * * * *